(12) United States Patent
Juestel et al.

(10) Patent No.: US 6,736,995 B2
(45) Date of Patent: *May 18, 2004

(54) PLASMA PICTURE SCREEN WITH A PHOSPHOR LAYER

(75) Inventors: Thomas Juestel, Aachen (DE); Hans-Helmut Bechtel, Roetgen (DE); Walter Mayr, Alsdorf (DE)

(73) Assignee: Koninklijke Philips Electronics N.V, Eindhoven (NL)

( * ) Notice: Subject to any disclaimer, the term of this patent is extended or adjusted under 35 U.S.C. 154(b) by 45 days.

This patent is subject to a terminal disclaimer.

(21) Appl. No.: 10/059,429

(22) Filed: Jan. 29, 2002

(65) Prior Publication Data

US 2002/0160226 A1 Oct. 31, 2002

(30) Foreign Application Priority Data

Feb. 1, 2001 (DE) .......................................... 101 04 364

(51) Int. Cl.⁷ .............................................. C09K 11/08
(52) U.S. Cl. ........................ 252/301.4 R; 252/301.4 P; 252/301.4 F; 252/301.4 H; 252/301.4 S; 252/301.5; 252/301.6 R; 252/301.6 S; 252/301.6 P; 252/301.6 F; 428/690; 313/582; 313/584; 313/468; 313/543; 313/485; 313/486; 313/503; 313/496

(58) Field of Search .......................... 428/690; 713/582, 713/584, 467, 468, 543, 485, 486, 496, 503; 252/301.4 R, 301.4 P, 301.4 S, 301.4 H, 301.5, 301.6 R, 301.6 S, 301.6 P

(56) References Cited

U.S. PATENT DOCUMENTS

| | | | | |
|---|---|---|---|---|
| 4,452,843 A | * | 6/1984 | Kaule et al. ................. | 428/199 |
| 5,714,835 A | * | 2/1998 | Zachau et al. .............. | 313/486 |
| 6,344,261 B1 | * | 2/2002 | Kaule et al. ................. | 428/195 |
| 6,462,473 B1 | * | 10/2002 | Juestel et al. ............... | 313/586 |
| 6,552,487 B1 | * | 4/2003 | Ellens et al. ................ | 313/503 |

FOREIGN PATENT DOCUMENTS

| | | | | |
|---|---|---|---|---|
| JP | 11-131059 | | 5/1999 | ........... C09K/11/08 |
| WO | WO 99/38701 | * | 8/1999 | |

* cited by examiner

Primary Examiner—C. Melissa Koslow

(57) ABSTRACT

This invention relates to a plasma picture screen provided with a phosphor layer which comprises an intrinsically pigmented phosphor. The plasma picture screen has an improved value for the luminance contrast performance without the efficiency of the phosphors being detracted from.

5 Claims, 1 Drawing Sheet

PLASMA PICTURE SCREEN WITH A PHOSPHOR LAYER

Figure 1:
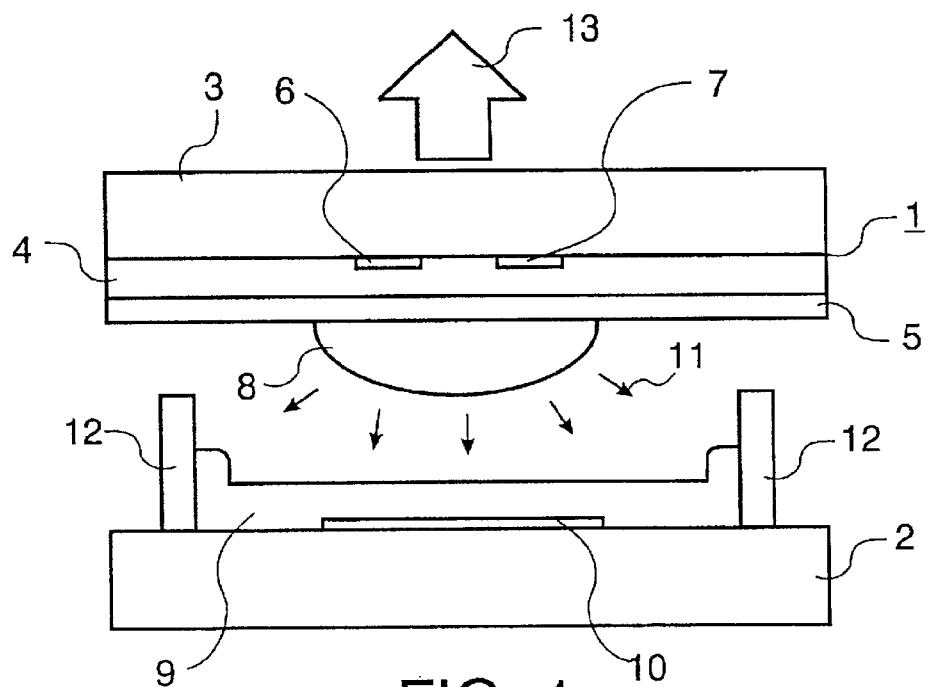

The invention relates to a plasma picture screen provided with a phosphor layer. The invention further relates to a luminous screen provided with a phosphor layer, a phosphor preparation, and a phosphor.

Plasma picture screens render possible color pictures of high resolution and large picture screen diagonal, and they have a compact construction. A plasma picture screen comprises a hermetically closed glass cell which is filled with a gas, with electrodes arranged in a grid. The application of a voltage causes a gas discharge which generates light in the ultraviolet range. This light can be converted into visible light by means of phosphors and can then be emitted through the front plate of the glass cell to the viewer.

It is important for achieving a sufficient picture contrast in daylight that the plasma picture screen should have a high luminance in combination with a reflection of external light which is as low as possible. The characteristic quantity for this property is the so-called Luminance Contrast Performance (LCP):

$$LCP = \frac{\text{Luminance }(L)}{\sqrt{\text{Reflection }(R)}}$$

The contrast may be improved, and accordingly also the LCP value, for example, in that the phosphors are pigmented with inorganic pigments. The inorganic pigments are chosen such that they are as transparent as possible to the color emitted by the respective phosphor while absorbing the remaining spectral components.

JP 11-131059 describes a phosphor for plasma picture screens which is pigmented with an inorganic pigment in the same manner as the phosphors for cathode ray tubes. Since the VUV radiation used for exciting phosphors in plasma picture screens has only a small penetration depth into the phosphor particle, a pigmentation of the phosphor particle will clearly reduce its efficiency.

It is accordingly an object of the present invention to avoid the disadvantages of the prior art and to provide an improved plasma picture screen.

This object is achieved by means of a plasma picture screen provided with a phosphor layer which comprises a phosphor which is intrinsically pigmented.

It is advantageous here that the pigmentation of the phosphor is not achieved externally through the application of inorganic pigments on the surface of the phosphor particles, but that the phosphor is pigmented on the inside. It is avoided thereby that the efficiency of the phosphor is reduced in that the VUV light is absorbed by the pigments provided on the surface.

It is particularly advantageous that the phosphor is intrinsically pigmented in that the host lattice of the phosphor comprises an ion which has absorption bands within the host lattice in the wavelength range of the emission of the phosphor.

Owing to this advantageous embodiment of the pigmentation, the phosphor is given an intrinsic color which corresponds to its emission color. Since the intrinsic color of the phosphor corresponds to its emission color, the phosphor shows a high reflection at its emission color, whereas the remaining spectral components are less strongly reflected. It is prevented thereby that the reflected daylight mixes itself with the colored light emitted by the phosphor and thus weakens the contrast.

It is particularly advantageous that the phosphor has the composition $(Ba_{1-x-y}Sr_x)(Mg_{1-z}Co_z)_oAl_pO_q{:}Eu_y$ with $0 \leq X < 1$, $0.01 \leq Y \leq 0.40$, $0 < z < 1$, o=chosen from the groups 1 and 3, p=chosen from the groups 10 and 14, and q=chosen from the groups 17 and 23.

These intrinsically pigmented phosphors efficiently convert VUV radiation into colored light.

The invention further relates to a luminous screen provided with a phosphor layer and to a phosphor preparation, each comprising a phosphor which is intrinsically pigmented.

Intrinsically pigmented phosphors may be used to particular advantage in luminous screens of optical display devices in which the exciting radiation cannot penetrate pigment particles, with which a similar intrinsic color of the phosphor is achieved, without appreciable energy loss.

The invention further relates to a phosphor with the composition $(Ba_{1-x-y}Sr_x)(Mg_{1-z}Co_z)_oAl_pO_q{:}Eu_y$ with $0 \leq x < 1$, $0.01 \leq y \leq 0.40$, $0 < z < 1$, o=chosen from the groups 1 and 3, p=chosen from the groups 10 and 14, and q=chosen from the groups 17 and 23.

Figure 2:
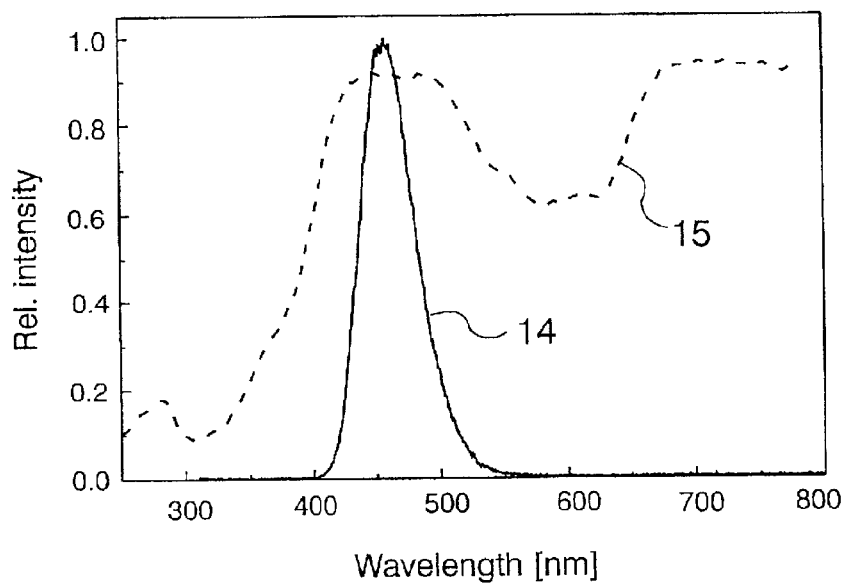

The invention will now be explained in more detail below with reference to two Figures and two embodiments, in which FIG. 1 shows the construction and working principle of a single plasma cell in an AC plasma picture screen, and FIG. 2 shows the emission and reflection spectrum of $Ba_{0.9}(Mg_{0.99}Co_{0.01})Al_{10}O_{17}{:}Eu_{0.1}$.

In FIG. 1, a plasma cell of an AC plasma picture screen with a coplanar arrangement of the electrodes comprises a front plate 1 and a carrier plate 2. The front plate 1 comprises a glass plate 3 on which a dielectric layer 4 and thereon a protective layer 5 are provided. The protective layer 5 is preferably made of MgO and the dielectric layer 4, for example, of glass containing PbO. Parallel, strip-shaped discharge electrodes 6, 7 are provided on the glass plate 3 and covered by the dielectric layer 4. The discharge electrodes 6, 7 are made, for example, from metal or ITO. The carrier plate 2 is made of glass, and parallel, strip-shaped address electrodes 10, for example made of Ag, are provided on the carrier plate 2 so as to run perpendicularly to the discharge electrodes 6, 7. The address electrodes (10) are covered with a phosphor layer 9 which emits light in one of the three basic colors red, green, or blue. For this purpose the phosphor layer 9 is subdivided into several color segments. Usually the red-, green-, and blue-emitting color segments of the phosphor layer 9 are provided in the form of perpendicular stripe triplets. The individual plasma cells are separated by a ribbed structure 12 with separating ribs, preferably made of a dielectric material.

A gas, preferably a rare gas mixture of, for example, He, Ne, or Kr with Xe as the UV-light generating component is present in the plasma cell, also between the discharge electrodes 6, 7 which act as the cathode and anode in alternation. After the surface discharge has been ignited, such that charges can flow along a discharge path lying between the discharge electrodes 6, 7 in a plasma region 8, a plasma is formed in the plasma region 8 by means of which radiation 11 in the UV range, in particular in the VUV range, is generated in dependence on the composition of the gas. This radiation 11 excites the phosphor layer 9 into luminescence, emitting light 13 in one of the three basic colors, which light passes through the front plate 1 to the exterior and thus forms a luminous pixel on the picture screen.

Intrinsically pigmented phosphors are preferably used as the phosphors.

The blue-emitting intrinsically pigmented phosphor used may be, for example, $(Ba_{1-x-y}Sr_x)(Mg_{1-z}Co_z)_oAl_pO_q{:}Eu_y$ with $0 \leq x < 1$, $0.01 \leq y \leq 0.40$, $0 < z < 1$, o=chosen from the groups 1 and 3, p=chosen from the groups 10 and 14, and q=chosen from the groups 17 and 23. Preferably, $Ba_{0.9}(Mg_{0.99}Co_{0.01})Al_{10}O_{17}{:}Eu_{0.1}$ or $Ba_{0.9}(Mg_{0.99}Co_{0.01})_3Al_{14}O_{23}{:}Eu_{0.1}$ is used.

A phosphor may be intrinsically pigmented, for example, in that its host lattice is doped with an ion which has absorption bands within the host lattice in the wavelength range of the emission of the phosphor.

Thus, for example, the host lattice of $BaMgAl_{10}O_{17}$:Eu consists of an alternating sequence of BaO layers and $MgAl_2O_4$-containing spinel blocks. The $MgAl_2O_4$-containing spinel blocks have a structure very similar to that of $CoAl_2O_4$, and since the $Co^{2+}$ ion with 75 pm has an ion radius similar to that of the $Mg^{2+}$ ion (72 pm for a coordination number of 6), a few atom percents of $Mg^{2+}$ can be replaced by $Co^{2+}$ in the spinel blocks. Since the $Co^{2+}$ ion has the same coordination sphere in this crystal lattice as in $CoAl_2O_4$, the crystal field and thus the position of the absorption bands are identical to those of $CoAl_2O_4$. The intrinsic color of these phosphors intrinsically pigmented with $Co^{2+}$ thus corresponds to the intrinsic color of $BaMgAl_{10}O_{17}$:Eu pigmented with $CoAl_2O_4$.

A green-emitting phosphor with a green intrinsic color may be prepared in that the host lattice of the phosphor is co-doped with a few atom percents of $Pr^{3+}$ ions. $Pr^{3+}$ ions have intensive f-f absorption bands at 600 and 450 nm independently of the host lattice. A green-emitting, intrinsically pigmented phosphor which may be used in plasma picture screens is, for example, $(Y_{1-x-y-z}Gd_xPr_z)BO_3$:$Tb_y$ ($0 \leq x \leq 1$, $0.0 \leq y \leq 0.10$, $0 < z \leq 0.05$).

To prepare an intrinsically pigmented phosphor, the respective starting materials such as metal oxides and/or inorganic acids are first mixed in the correct quantities. The mixture is heated up in a hydrogen-containing nitrogen atmosphere or CO atmosphere for 2 to 4 hours to a temperature of between 1000° C. and 1600° C. Then the mixture is calcinated for 2 to 4 hours at 1000° C. to 1600° C. in a hydrogen-containing nitrogen atmosphere or CO atmosphere. The mixture may subsequently be calcinated once more for at least one more hour in an atmosphere of $N_2/H_2$/water vapor at 1000° C. to 1600° C. The mixture is cooled down to room temperature in a hydrogen-containing nitrogen atmosphere or CO atmosphere, and the resulting phosphor powder is milled and sieved.

To prepare a segmented phosphor layer 9, a phosphor preparation is manufactured from an intrinsically pigmented phosphor in a known process and is provided on a carrier plate 2 with a ribbed structure 12 with separating ribs and address electrodes 10 in a dry coating process, for example electrostatic deposition or electrostatically supported dusting, or by means of wet coating processes such as silk-screen printing, dispenser processes in which a phosphor preparation is provided from a nozzle moving along the channels, or sedimentation from the liquid phase. This method is subsequently also carried out for the two other colors.

The finished carrier plate 2 is used together with further components such as, for example, a front plate 1 and a rare gas mixture for the manufacture of a plasma picture screen.

Alternatively, intrinsically pigmented phosphors may be used in color cathode ray tubes which operate with low anode voltages such as, for example, vacuum fluorescence displays (VFDs) or field emission displays (FEDs).

Embodiment 1

For the preparation of $Ba_{0.9}(Mg_{0.99}Co_{0.01})Al_{10}O_{17}$:$Eu_{0.1}$, 11.00 g (55.75 mmole) $BaCO_3$, 1.723 g (42.75 mmole) MgO, 1.158 g (18.59 mmole) $MgF_2$, 31.60 g (309.7 mmole) $Al_2O_3$, 982 mg (2.79 mmole) $Eu_2O_3$, and 50 mg (0.21 mmole) $Co_3O_4$ were thoroughly mixed and put in a corundum crucible. The mixture was heated to a temperature of between 1000 and 1600° C. over 2.5 h in a hydrogen-containing nitrogen atmosphere. Then the mixture was calcinated at 1000 to 1600° C. in the hydrogen-containing nitrogen atmosphere for 2 to 4 h. Subsequently, the mixture was calcinated for one more hour in an atmosphere of $N_2/H_2$/water vapor at 1000 to 1600° C. The mixture was then allowed to cool down to room temperature in a hydrogen-containing nitrogen atmosphere. The resulting phosphor powder was milled and sieved. The intrinsic color of the phosphor powder was blue.

The color point of the phosphor thus obtained was x=0.15 and y=0.04.

In FIG. 2, the curve 14 shows the emission spectrum and the curve 15 the reflection spectrum of $Ba_{0.9}(Mg_{0.99}Co_{0.01})Al_{10}O_{17}$:$Eu_{0.1}$.

Like $BaMgAl_{10}O_{17}$:Eu, $Ba_{0.9}(Mg_{0.99}Co_{0.01})Al_{10}O_{17}$:$Eu_{0.1}$ crystallizes in the hexagonal crystal system ($\alpha=\beta=90°$, $\gamma=120°$).

Table 1 lists the crystallographic data for $BaMgAl_{10}O_{17}$:Eu and $Ba_{0.9}(Mg_{0.99}Co_{0.01})Al_{10}O_{17}$:$Eu_{0.1}$ for comparison. All reflexes could be indicated for $Ba_{0.9}(Mg_{0.99}Co_{0.01})Al_{10}O_{17}$:$Eu_{0.1}$.

TABLE 1

Dimensions of the axes of the elementary cells of $BaMgAl_{10}O_{17}$:Eu and $Ba_{0.9}(Mg_{0.99}Co_{0.01})Al_{10}O_{17}$:$Eu_{0.1}$

| Elementary cell | $Ba_{0.9}(Mg_{0.99}Co_{0.01})Al_{10}O_{17}$:$Eu_{0.1}$ [Å] | $BaMgAl_{10}O_{17}$:Eu [Å] |
|---|---|---|
| A | 5.624 (2) | 5.625 (2) |
| B | 5.624 (2) | 5.625 (2) |
| C | 22.625 (6) | 22.617 (7) |

Embodiment 2

For the preparation of $(Y_{0.4625}Gd_{0.4625}Pr_{0.01})BO_3$:$Tb_{0.065}$, 10.00 g (44.29 mmole) $Y_2O_3$, 16.05 g (44.29 mmole) $Gd_2O_3$, 326.0 mg (319.2 μmole) $Pr_6O_{11}$, 2.329 g (3.115 mmole) $Tb_4O_7$, and 11.17 g (180.6 mmole) $H_3BO_3$ were thoroughly mixed and put in a corundum crucible. The mixture was heated up in a CO atmosphere to a temperature of 1000 to 1400° C. in 2.5 h. The mixture was then calcinated at 1000 to 1400° C. in the CO atmosphere for 2 to 4 hours. Subsequently, the mixture was allowed to cool down to room temperature in the CO atmosphere. The resulting phosphor powder was milled and sieved. The intrinsic color of the phosphor powder was green.

The color point of the phosphor thus obtained was x=0.134 and y=0.62.

What is claimed is:

1. A plasma picture screen provided with a phosphor layer which comprises a phosphor which is intrinsically pigmented.

2. A plasma picture screen as claimed in claim 1, wherein the phosphor has the composition $(Ba_{1-x-y}Sr_x)(Mg_{1-z}Co_z)_oAl_pO_q$:$Eu_y$ with $0 \leq x<1$, $0.01 \leq y \leq 0.40$, $0<z<1$, and with o=chosen from the groups 1 and 3, p=chosen from the groups 10 and 14, and q=chosen from the groups 17 and 23.

3. A luminous screen provided with a phosphor layer which comprises a phosphor which is intrinsically pigmented.

4. A phosphor preparation comprising a phosphor which is intrinsically pigmented.

5. A phosphor with the composition $(Ba_{1-x-y}Sr_x)(Mg_{1-z}Co_z)_oAl_pO_q$:$Eu_y$ with $0 \leq x<1$, $0.01 \leq y \leq 0.40$, $0<z<1$, and with o=chosen from the groups 1 and 3, p=chosen from the groups 10 and 14, and q=chosen from the groups 17 and 23.

* * * * *